United States Patent
Sweeney

(10) Patent No.: US 11,263,905 B2
(45) Date of Patent: *Mar. 1, 2022

(54) TARGET ADDRESSING SYSTEM

(71) Applicant: Uber Technologies, Inc., San Francisco, CA (US)

(72) Inventor: Matthew Sweeney, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/930,223

(22) Filed: May 12, 2020

(65) Prior Publication Data

US 2020/0273337 A1    Aug. 27, 2020

Related U.S. Application Data

(63) Continuation of application No. 16/118,916, filed on Aug. 31, 2018, now Pat. No. 10,720,056, which is a
(Continued)

(51) Int. Cl.
*G08G 1/14* (2006.01)
*H04W 4/029* (2018.01)
(Continued)

(52) U.S. Cl.
CPC ............. *G08G 1/146* (2013.01); *G08G 1/005* (2013.01); *G08G 1/143* (2013.01); *G08G 1/147* (2013.01);
(Continued)

(58) Field of Classification Search
CPC ........ G08G 1/146; G08G 1/005; G08G 1/147; G08G 1/148; G08G 1/202; H04W 4/029
See application file for complete search history.

(56) References Cited

U.S. PATENT DOCUMENTS

| 5,945,919 A | 8/1999 | Trask |
| 6,356,838 B1 | 3/2002 | Paul |

(Continued)

FOREIGN PATENT DOCUMENTS

| CN | 106651728 | 5/2017 |
| EP | 2682868 | 1/2014 |

(Continued)

OTHER PUBLICATIONS

ISR and Written Opinion dated Apr. 30, 2019 in PCT/US2019/012902.
EESR in EP 15765578 dated Oct. 25, 2017.
EESR in EP 16824968.8 dated Jan. 30, 2019.
EESR in EP 17771000.1 dated Mar. 21, 2019.
Exam Report in IN 201647031195 dated Oct. 30, 2019.
Exam Report No. 1 in AU 2014386266 dated Feb. 14, 2020.
(Continued)

*Primary Examiner* — Santiago Garcia
(74) *Attorney, Agent, or Firm* — Mahamedi IP Law LLP

(57) ABSTRACT

A system can receive a request for a service from the computing device of a given user of the network service. Based on the request, the system can determine a vehicle stopping location for a driver of a vehicle that is to service the request, and transmit map data to the computing device of the driver to present map content indicating (i) the vehicle stopping location for a vehicular portion of the service, and (ii) a path for the driver from the vehicle stopping location to a target location, the path to be followed by the driver upon parking the vehicle at the vehicle stopping location. The system can further transmit a set of delivery instructions to the computing device of the driver to specify one or more actions for delivering an item to the given user at a location specified by the given user.

20 Claims, 7 Drawing Sheets

Related U.S. Application Data continuation of application No. 15/465,003, filed on Mar. 21, 2017, now Pat. No. 10,115,308.

(60) Provisional application No. 62/311,339, filed on Mar. 21, 2016.

(51) Int. Cl.
  *G08G 1/005* (2006.01)
  *G08G 1/00* (2006.01)
  *H04W 88/02* (2009.01)

(52) U.S. Cl.
  CPC ............ *G08G 1/148* (2013.01); *G08G 1/202* (2013.01); *H04W 4/029* (2018.02); *H04W 88/02* (2013.01)

(56) References Cited

U.S. PATENT DOCUMENTS

| | | |
|---|---|---|
| 6,453,298 B2 | 9/2002 | Murakami |
| 6,587,782 B1 | 7/2003 | Nocek et al. |
| 6,756,913 B1 | 6/2004 | Ayed |
| 7,248,184 B2 | 7/2007 | Gelhar |
| 7,353,034 B2 | 4/2008 | Haney |
| 7,606,663 B2 | 10/2009 | Neef |
| 7,657,256 B2 | 2/2010 | Bates |
| 7,817,990 B2 | 10/2010 | Pamminger |
| 7,917,153 B2 | 3/2011 | Orwant et al. |
| 7,970,749 B2 | 6/2011 | Uhlir |
| 8,065,342 B1 | 11/2011 | Borg |
| 8,339,251 B2 | 12/2012 | Roberts |
| 8,504,406 B2 | 8/2013 | Miller |
| 8,538,374 B1 | 9/2013 | Haimo et al. |
| 8,538,956 B1 | 9/2013 | Szabadka |
| 8,554,608 B1 | 10/2013 | O'Connor |
| 8,624,727 B2 | 1/2014 | Saigh et al. |
| 8,630,897 B1 * | 1/2014 | Prada Gomez .... G06Q 30/0241 |
| | | 705/14.11 |
| 8,630,987 B2 | 1/2014 | Prada Gomez |
| 8,719,391 B2 | 5/2014 | Hamalainen et al. |
| 8,768,294 B2 | 7/2014 | Reitnour et al. |
| 8,775,070 B1 | 7/2014 | Bhatia |
| 8,855,916 B2 | 10/2014 | Meredith et al. |
| 8,902,260 B2 | 12/2014 | Kuhne |
| 9,147,335 B2 | 9/2015 | Rahunathan |
| 9,244,147 B1 * | 1/2016 | Soundararajan ....... G01C 21/00 |
| 9,372,090 B2 | 6/2016 | Tucker |
| 9,424,515 B2 | 8/2016 | Atlas |
| 9,631,933 B1 | 4/2017 | Aula |
| 10,082,793 B1 | 9/2018 | Glaser |
| 10,203,212 B2 | 2/2019 | Mazzella |
| 2002/0054082 A1 | 5/2002 | Karpf |
| 2002/0143587 A1 | 10/2002 | Champernown |
| 2004/0158483 A1 | 8/2004 | Lecouturier |
| 2006/0080188 A1 | 4/2006 | Jung |
| 2006/0235739 A1 | 10/2006 | Levis et al. |
| 2007/0038529 A1 | 2/2007 | Jung |
| 2007/0093247 A1 | 4/2007 | Yaqub |
| 2007/0150375 A1 * | 6/2007 | Yang ...................... G06Q 30/06 |
| | | 705/339 |
| 2008/0014908 A1 | 1/2008 | Vasant |
| 2008/0027772 A1 | 1/2008 | Gernega |
| 2008/0114629 A1 | 5/2008 | Pavlov |
| 2008/0122691 A1 | 5/2008 | Carani et al. |
| 2008/0125964 A1 | 5/2008 | Carani |
| 2008/0195428 A1 | 8/2008 | O'Sullivan |
| 2009/0005963 A1 | 1/2009 | Jarvinen |
| 2009/0006182 A1 | 1/2009 | Gammon |
| 2009/0113296 A1 | 4/2009 | Lacy et al. |
| 2009/0156241 A1 | 6/2009 | Staffaroni et al. |
| 2009/0171939 A1 | 7/2009 | Athsani |
| 2009/0216600 A1 | 8/2009 | Hill |
| 2009/0222482 A1 | 9/2009 | Klassen |
| 2009/0296990 A1 * | 12/2009 | Holland ..................... G06T 7/60 |
| | | 382/106 |
| 2010/0017126 A1 | 1/2010 | Holcman |
| 2010/0070168 A1 | 3/2010 | Sumcad |
| 2010/0223065 A1 | 9/2010 | Jung |
| 2010/0253542 A1 | 10/2010 | Seder |
| 2010/0280852 A1 | 11/2010 | Huang |
| 2011/0052042 A1 | 3/2011 | Ben Tzvi |
| 2011/0081919 A1 | 4/2011 | Das et al. |
| 2011/0112768 A1 | 5/2011 | Doyle |
| 2011/0231493 A1 | 9/2011 | Dyor |
| 2011/0238300 A1 | 9/2011 | Schenken |
| 2011/0246246 A1 | 10/2011 | Johnson |
| 2011/0307282 A1 | 12/2011 | Camp |
| 2012/0041675 A1 | 2/2012 | Juliver et al. |
| 2012/0046110 A1 | 2/2012 | Amaitis et al. |
| 2012/0089326 A1 | 4/2012 | Bouve |
| 2012/0158445 A1 | 6/2012 | Dufford |
| 2012/0200411 A1 | 8/2012 | Best |
| 2012/0232943 A1 | 9/2012 | Myr |
| 2012/0233246 A1 | 9/2012 | Guernez |
| 2012/0239452 A1 | 9/2012 | Trivedi |
| 2012/0253548 A1 * | 10/2012 | Davidson ........... G06Q 10/0631 |
| | | 701/1 |
| 2012/0290337 A1 | 11/2012 | Helmy |
| 2012/0306659 A1 | 12/2012 | Ben-Dayan |
| 2013/0054281 A1 | 2/2013 | Thakkar |
| 2013/0096813 A1 | 4/2013 | Geffner |
| 2013/0132140 A1 | 5/2013 | Amin |
| 2013/0162425 A1 | 6/2013 | Raghunathan |
| 2013/0174076 A1 | 7/2013 | Geelen |
| 2013/0196692 A1 | 8/2013 | Huang |
| 2013/0218455 A1 | 8/2013 | Clark |
| 2013/0226365 A1 | 8/2013 | Brozovich |
| 2013/0232169 A1 | 9/2013 | Gill et al. |
| 2013/0285855 A1 | 10/2013 | Dupray |
| 2013/0290200 A1 | 10/2013 | Singhal |
| 2013/0310053 A1 | 11/2013 | Srivastava et al. |
| 2013/0332527 A1 | 12/2013 | Du |
| 2013/0339076 A1 | 12/2013 | Baranda |
| 2014/0012909 A1 | 1/2014 | Sankar |
| 2014/0066090 A1 | 3/2014 | Henderson |
| 2014/0067901 A1 | 3/2014 | Shaw |
| 2014/0087711 A1 | 3/2014 | Geyer |
| 2014/0108201 A1 | 4/2014 | Frechett |
| 2014/0129951 A1 | 5/2014 | Amin |
| 2014/0156410 A1 | 6/2014 | Wuersch |
| 2014/0172727 A1 | 6/2014 | Abhyanker |
| 2014/0173511 A1 | 6/2014 | Lehmann |
| 2014/0207375 A1 | 7/2014 | Lerenc |
| 2014/0279707 A1 | 9/2014 | Joshua |
| 2014/0365250 A1 | 12/2014 | Ikeda |
| 2015/0031388 A1 | 1/2015 | Chatterjee et al. |
| 2015/0032484 A1 | 1/2015 | Mermelstein |
| 2015/0055178 A1 | 2/2015 | Ishibashi |
| 2015/0073645 A1 | 3/2015 | Davidsson |
| 2015/0081581 A1 | 3/2015 | Gishen |
| 2015/0100238 A1 | 4/2015 | Cai |
| 2015/0148060 A1 | 5/2015 | Parab et al. |
| 2015/0154810 A1 | 6/2015 | Tew |
| 2015/0161564 A1 | 6/2015 | Sweeney |
| 2015/0254581 A1 | 9/2015 | Brahme |
| 2015/0323327 A1 | 11/2015 | Lord |
| 2015/0323330 A1 | 11/2015 | Lord |
| 2015/0323331 A1 | 11/2015 | Lord |
| 2015/0339923 A1 | 11/2015 | Konig et al. |
| 2015/0339928 A1 * | 11/2015 | Ramanujam ........... G06Q 50/30 |
| | | 701/23 |
| 2015/0352128 A1 | 11/2015 | Lord |
| 2016/0014561 A1 | 1/2016 | Inzer |
| 2016/0019496 A1 | 1/2016 | Gorlin |
| 2016/0026935 A1 | 1/2016 | Botea |
| 2016/0026936 A1 | 1/2016 | Richardson |
| 2016/0034845 A1 | 2/2016 | Hiyama |
| 2016/0132792 A1 | 5/2016 | Rosnow |
| 2016/0191637 A1 | 6/2016 | Memon |
| 2016/0217669 A1 | 7/2016 | Benoit |
| 2016/0231129 A1 | 8/2016 | Erez |
| 2016/0301698 A1 | 10/2016 | Katara |
| 2016/0314511 A1 | 10/2016 | Jung |
| 2016/0321771 A1 | 11/2016 | Liu |

(56) References Cited

U.S. PATENT DOCUMENTS

| | | |
|---|---|---|
| 2016/0363458 A1 | 12/2016 | Guo |
| 2016/0364679 A1 | 12/2016 | Cao |
| 2016/0364823 A1 | 12/2016 | Cao |
| 2016/0370194 A1 | 12/2016 | Colijn |
| 2017/0012920 A1 | 1/2017 | Chheda |
| 2017/0087915 A1 | 3/2017 | Guo |
| 2017/0115125 A1* | 4/2017 | Outwater ............... G08G 1/202 |
| 2017/0147959 A1* | 5/2017 | Sweeney ............... G07C 5/008 |
| 2017/0169535 A1 | 6/2017 | Tolkin |
| 2017/0191841 A1 | 7/2017 | Marueli |
| 2017/0191845 A1 | 7/2017 | Marueli |
| 2017/0200249 A1 | 7/2017 | Ullrich |
| 2017/0240098 A1* | 8/2017 | Sweeney ............... B60Q 1/50 |
| 2017/0255881 A1* | 9/2017 | Ritch ............... G08G 1/096883 |
| 2017/0270794 A1 | 9/2017 | Sweeney |
| 2017/0272901 A1 | 9/2017 | Sweeney |
| 2017/0351977 A1 | 12/2017 | Bijor |
| 2018/0306595 A1 | 10/2018 | Marueli |
| 2018/0315148 A1 | 11/2018 | Luo |
| 2018/0349825 A1 | 12/2018 | Yamamoto |
| 2018/0374350 A1 | 12/2018 | Sweeney |
| 2019/0087754 A1 | 3/2019 | Farrelly |
| 2019/0109910 A1 | 4/2019 | Sweeney |
| 2019/0149945 A1 | 5/2019 | Chheda |
| 2019/0172353 A1 | 6/2019 | Chen |
| 2019/0197460 A1 | 6/2019 | Truong |
| 2019/0212157 A1 | 7/2019 | Wu |
| 2020/0005370 A1 | 1/2020 | Jung |
| 2020/0128361 A1 | 4/2020 | Chheda |
| 2020/0145503 A1 | 5/2020 | Sweeney |
| 2020/0273337 A1 | 8/2020 | Sweeney |
| 2021/0010817 A1 | 1/2021 | Wu |

FOREIGN PATENT DOCUMENTS

| | | |
|---|---|---|
| EP | 2879410 | 6/2015 |
| EP | 3046058 | 7/2016 |
| JP | 2004-302942 | 10/2004 |
| KR | 10-2011-0061568 | 6/2011 |
| WO | WO 2003/040972 | 5/2005 |
| WO | WO 2011-120161 | 10/2011 |
| WO | WO 2017/079222 | 5/2017 |

OTHER PUBLICATIONS

Exam Report No. 1 in AU 2015231331 dated Nov. 13, 2019.
Exam Report No. 1 in AU 2016293831 dated Aug. 28, 2019.
How to book two cabs at the same time in Uber, Jun. 30, 2017 (https://fastandclean.org/ book-two-cabs-time-uber).
How to request multiple Uber vehicles, Aug. 15, 2013 (https://www.wikihow.com/ Request-Multiple-Uber-Vehicles.
International Search Report and Written Opinion in PCT/US2016/019895 dated Jun. 29, 2016.
International Search Report in PCT/US2015/021227 dated Jun. 18, 2015.
IPRP in PCT/US2016/019895 dated Sep. 8, 2017.
Is it possible to order 2 Ubers at the same time, Jul. 13, 2015 (https://web.archive.org/web/20150801000000*/https://android.Stackexchange.com/questions/114027/is-it- possible-to-order-2-ubers-at-the-same-time.
ISR and Written Opinion in PCT/US2017/023343 dated Jul. 6, 2017.
ISR and Written Opinion in PCT/US2017/023350 dated Jun. 29, 2017.
ISR and Written Opinion in PCT/US2018/055256 dated Jan. 30, 2019.
M.E.T. Horn, "Multimodal and demand-responsive passenger transport systems: a modeling framework with embedded control systems", Transportation Research Part A 36, 167-188 (2002) Year: 2000.
Written Opinion in PCT/US2018/055256 dated Jul. 19, 2019.
International Search Report and Written Opinion in PCT/US2016/037088 dated Aug. 24, 2016.
IPRP in PCT/US2016/037088 dated Dec. 21, 2017.
Examination Report No. 1 in AU 2018278906 dated Feb. 11, 2020.
Reissued Examination Report No. 1 in AU 2018278906 dated Mar. 4, 2020.
Pre-Examination Office Action in BR 1120170226709 dated Jun. 5, 2020.
WRO in PCT/US2018/055256 dated Jul. 19, 2019.
Exam Report No. 1 in AU 2017238067 dated Mar. 11, 2021.
Exam Report No. 1 in AU 2017238096 dated Jul. 19, 2021.

* cited by examiner

TARGET ADDRESSING SYSTEM

RELATED APPLICATIONS

This application is a continuation of U.S. patent application Ser. No. 16/118,916, filed on Aug. 31, 2018; which is a continuation of U.S. patent application Ser. No. 15/465,003, filed Mar. 21, 2017, now U.S. Pat. No. 10,115,308, which claims the benefit of priority to U.S. Provisional Patent Application No. 62/311,339, filed Mar. 21, 2016—the aforementioned applications being hereby incorporated by reference in their respective entireties.

BACKGROUND

For any arbitrary location on the map (e.g., given a latitude and longitude coordinate), a typical reverse geocoding operation returns an address for the location. This is the typical reverse geocoding address.

DETAILED DESCRIPTION

Figure 1:
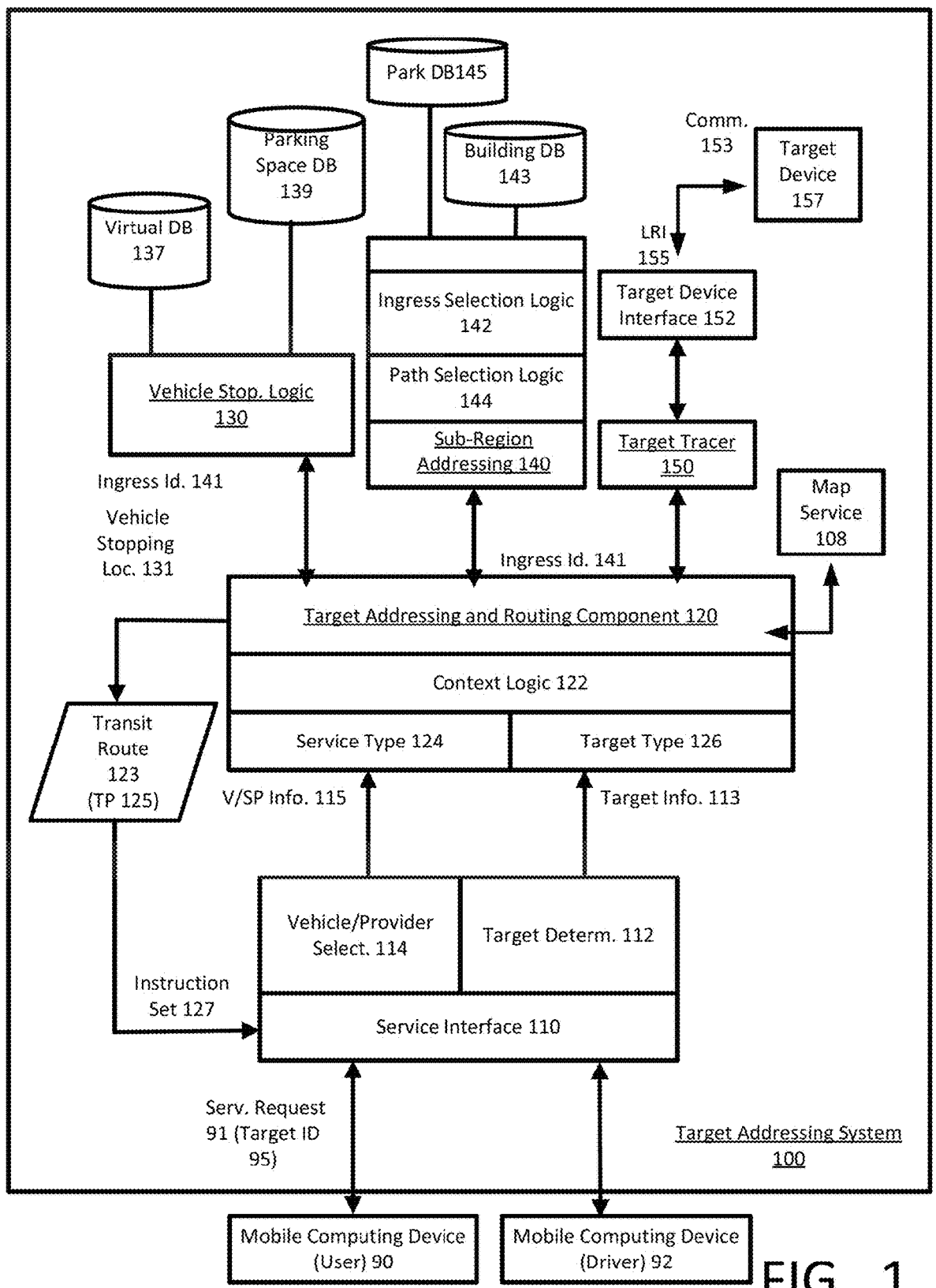
FIG. 1 illustrates a dynamic addressing system for use with transit services, according to one or more embodiments.

Examples include a system and service for addressing users, vehicles, and service providers to targets using multi-segmented routes and/or targets whom are persons.

According to some examples, an addressing system determines a target for a service request. The addressing system determines a vehicle stopping location for a transit route to the target, where the vehicle stopping location is different than a location of the target. The addressing system may send an instruction set to a vehicle that is providing the transit service, where the instruction set identifies the vehicle stopping location as part of a sequence in which the vehicle comes to a stop to fulfill the service request.

As used herein, a client device, a driver device, a computing device, and/or a mobile device refer to devices corresponding to desktop computers, cellular devices or smartphones, wearable electronic devices, laptop computers, tablet devices, etc., that can provide network connectivity and processing resources for communicating with the system over one or more networks. Client devices and driver devices can each operate a designated service application (e.g., a client application and a driver application, respectively) that is configured to communicate with an on-demand service arrangement system. A driver device can also correspond to a computing device that is installed in or incorporated with a vehicle, such as part of the vehicle's on-board computing system.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

An "address," and variants such as "addressing" is intended to mean a descriptor or identifier for a location. In the context of a route, an address can refer to a portion or segment of a route just prior to a transition or completion point.

A "target" refers to an objective for completing a route. According to examples, the target can include a person, a space in a public area, a particular location in sub-regions such as a building, a location within a mall, a park or other enclosure. Examples contemplate targets of varying granularity or dimension, such as a parking space, a virtual space of dimension that can occupy a vehicle, or a visible vicinity in proximity to an individual standing on a sidewalk or within a building. With examples, a target can also be dynamic, meaning the location of the target may move while a person or vehicle is being routed to the target.

FIG. 1 illustrates a target addressing system, according to one or more embodiments. A target addressing system 100 can be implemented as part of a network service by which transit services may be requested, facilitated, and/or arranged. Accordingly, examples such as shown with FIG. 1 may be implemented using, for example, a server or a combination of servers, communicating with mobile computing devices carried by providers and users for a transit service. In variations, some or all the functionality described with the addressing system 100 may be implemented using a distributed computing environment, such as provided by client computers and/or mobile computing devices which communicate with the network service.

In an example of FIG. 1, the addressing system 100 includes a service interface 110, a target address and routing component (TARC) 120, and one or more logical components for addressing a transit object in furtherance of a service request. In one example, one or more addressing subsystems of the addressing system 100 may include vehicle stopping logic 130, a sub-region addressing logic or component 140, and a target tracing component 150.

The service interface 110 may receive a service request 91 from any one of multiple types of sources, including a mobile computing device 90 of a user, or a programmatic entity residing with a server or autonomous entity (e.g., autonomous vehicle, drone, robotic locomotive). In an example of FIG. 1, the service interface 110 communicates with the mobile computing device 90 to receive the service request. In response to receiving the service request 91 and/or in response to the service request 91 being processed by the network service, the target addressing system 100 generates a transit route 123 that includes instructions to address a user, service provider, vehicle or autonomous entity to a location that is in proximity to a desired target. In some examples, the service request 91 is fulfilled at least in part by a human operator. For example, the service request 91 may correspond to a rider requesting a transport from a transport service (e.g., on-demand transport), a user requesting a delivery, or a messenger service (e.g., using vehicle, bicycle or runner).

In variations, the service request 91 can be fulfilled at least in part by an autonomous or robotic entity, such as an autonomous vehicle, a drone, or robotic locomotive. For example, the service request 91 may be fulfilled by a human user or operator meeting an autonomous entity at a target location. In other examples, the service request 91 can be fulfilled by an autonomous entity (e.g., autonomous vehicle) meeting another autonomous entity (e.g., drone) at a target location to exchange a physical object or perform another task. In such examples, the addressing system 100 fulfills the service request 91 by enabling a human or autonomous entity to meet a recipient autonomous entity at a target location that, for example, is less than four (4) feet in its greatest dimension. The addressing system 100 can operate to enable such a meeting by providing each entity (human or autonomous) an address to the target location (e.g., meeting location), so that each entity arrives at the target location within a threshold time period (e.g., within 5 seconds of each other).

In some examples, the service request 91 may include an identifier 95 of a target. The target identifier 95 can correspond to a global positioning system ("GPS") location, a map pin drop location (e.g., a location specified by a pin on a map user interface), a business name, landmark, or conventional street address. Still further, in some variations, the target identifier 95 can correspond to a name, phone number, moniker (e.g., alias used by a person) or other identifier of a human being. In other examples, the target identifier 95 can provide an identification of any object or place which can be located in a serviced geographic region at a given point interval of time (e.g., time interval of x seconds, minutes, hours, etc.). The addressing system 100 can generate the transit route 123 to, for example, (i) direct a user, service provider, vehicle or autonomous entity to a pickup location of a transport request, (ii) transport a rider from a pickup location to a drop-off location, (iii) deliver an item to a location or person, (iv) transport a rider to a location that is near a specific person, or (v) instruct an autonomous entity to arrive at a virtually defined location at a particular time interval.

Within the addressing system 100, the service request 91 can be processed to determine target information 113 for the target identifier 95 of the service request 91. A target determination component 112 can determine various types of information about a target of the service request 91, such as a type or classification of the target (e.g., person, an area on a street, a place within a building or business (or mall, park or other sub-region). According to examples, the target determination component 112 can correspond to, or be a part of, a transit matching system of the network service. The target determination component 112 can also be in communication with the service interface 110, such as illustrated in the example of FIG. 1. The target determination component 112 can utilize databases or other services (including third-party services) in order to determine information about the target. In some examples, the target determination component 112 accesses a semantic address database or service in order to determine a semantic address for the target. In such examples, the target information 113 corresponds to a semantic address that identifies a particular location using directional and/or spatial terms that are relative to a visually apparent landmark (e.g., "50 feet from the corner of Main Street and First".). Co-pending U.S. patent application Ser. No. 14/738,698 describes a system which can generate semantic, human understandable addresses in terms of landmarks, direction and proximity terms; and the aforementioned application is hereby incorporated by reference in its entirety. The target determination component 112 can determine target information 113 using input specified with the service request 91. For example, the target determination component 112 can determine the target information 113 using a GPS coordinate, mailing street address, business name, or sub-region identifier (e.g., building, park, strip mall, etc.).

In some implementations, the target determination component 112 can utilize a map service 108 and/or a GPS coding or reverse coding database to translate, for example, GPS coordinates to street addresses.

In one implementation, the target of the service request 91 corresponds to a human being, or alternatively, to a computing device (e.g., mobile computing device, wearable device, etc.) carried by an individual who is the target. As an example, a rider may request a transport service, and then specify a human being as the destination. For example, the rider can operate a client application on the mobile computing device 90 to specify a transit service, a pickup location, and/or a destination or target. The rider can select a feature, such as a "destination" field, and have the option of inputting or searching for a destination location and/or inputting or searching for a phone number or name (e.g., or another identifier) from the rider's contacts/phone application, messaging application, or social networking application. For example, the client application can communicate, e.g., via an application programming interface (API), with such applications of the mobile computing device 190 to display data from the application(s) in the user interface of the client application. The rider can then select an identifier of the person to travel to. In such an example, the driver or vehicle may then be selected by the network service to provide the transit service by transporting the rider to the location of the specified person.

As another example, a customer may request a delivery service (e.g., package delivery, service process) in which a package is delivered to a specific person, and the target addressing system 100 addresses a provider (e.g., package deliverer) to arrive at the location of the target person, with the provided address being sufficient to instruct the provider to locate the target without need of assistance or return communication from the target. Accordingly, examples provide for the target addressing system 100 to address the transit request to the location of the target even while the location of the target is in flux. In such examples, the target of the service request 91 can correspond to an identifier associated with a person. For example, the service request 91 can include a name, alias, and/or device identifier for a computing device associated with an individual (e.g., mobile phone number, service application moniker, etc.). By way of example, the service request 91 can specify any of the following: (i) "Package for Julia Jones," or "Package for 415-555-2233," (for transit service corresponding to package delivery); (ii) "Meeting User jojojones2233" (for transit service corresponding to transport request); or (iii) 415-555-2233.

Additionally, the service interface 110 can process the service request 91 to determine information such as what kind of vehicle or transit mechanism is required to fulfill the request, and how many phases or legs are required to fulfill the transit request. The transit type can be defined by the service provided (e.g., human delivery) or by a vehicle or vehicle type (e.g., delivery truck, autonomous vehicle, etc.). Additionally, the service interface 110 can include vehicle/provider selection logic 114 to select a vehicle or service provider from an available pool using criteria such as proximity and availability. With the selection, the vehicle/provider selection logic 114 can determine vehicle/service provider information 115, which can include information such as vehicle or service type, as well as driver or user who is providing or using the transit service.

The TARC 120 can utilize the target identifier 95, the target information 113 (e.g., street side location, location inside building, specific human being, etc.), and/or vehicle/service provider information 115 to determine a transit route 123 for the service request 91. The transit route 123 can include one or more target addresses that serve to locate one or more transition and/or completion locations for the transit route 123. In variations, the TARC 120 may determine that the requested transit service requires one mode of transportation to reach a desired location near the target (e.g., one leg of transit route 123). The TARC 120 may alternatively determine that the requested transit service requires multiple legs, including at least one transition point where a user or object of transport transitions between transit mechanisms. For example, a human user or service provider may transition from a vehicle leg to a pedestrian leg where the user or provider fulfills the remainder of the service request on foot.

For example, when the target is a person in a building, the TARC 120 may identify a first transit leg that guides the user/vehicle or service provider to drive a vehicle to a first transition point, where the user or provider can exit the vehicle. In this example, another leg of the transit route 123 can guide the user or provider to a selected ingress of the building. Still further, one or more legs of the transit route 123 may guide the user/provider within the building. For example, the system 100 may instruct the user/provider to walk within the building (e.g., using stairs, elevators, hallways, etc.) to reach a business.

The target may correspond to a location within the business, such that the transit route 123 terminates once, for example, the user or service provider reaches the receptionist area of the business. Alternatively, another leg of the transit route 123 may initiate once the user/provider reaches the business, with the leg instructing the user/provider to a vicinity of a person identified as the target. In this way, TARC 120 can assemble multiple legs of a transit service, collectively providing a multi-segmented (or legged) transit route 123 that guides the user or service provider to the particular location of the target.

In variations, the TARC 120 may identify multiple autonomous entities which are to combine and transport a person or object from a start location to the target location. The autonomous entities may be of different types (e.g., vehicle and drone), such that the arrival of one entity at the target location is timed with the arrival of another entity at the same target location. The TARC 120 can instruct each of the respective autonomous entities to arrive at a location where the leg of the human/object transport is to change in entity type. The TARC 120 may then instruct the autonomous entity of the second leg in arriving at the target location.

In order to determine multiple legs for transit route 123, the TARC 120 can include logic to determine stopping or transition points 125 as part of the transit route, with each stopping or transition point signifying a transition between legs of the transit route 123. As described with various examples, the transition points 125 can include stopping locations for people, human-operated vehicles, or autonomous entities. The transition points 125 may also signify transitions from one type of space to another, such as from an outdoor area to an ingress of a building or sub-region. As another example, a transition point 125 can identify a point of transition for a passenger or object (e.g., package changing hands), moving from a parking lot to a sidewalk as part of a transit route 123. In determining the transit route 123, the TARC 120 can determine the number of transit legs required, as well as the stopping or transition points, with an objective being to direct or guide the user or provider to the target in a manner that optimizes an objective of the transit route 123. For example, the objective may seek to minimize the distance or time of travel for the transit route 123, or alternatively, to maximize the proximity of the user/vehicle or service provider to the target at the termination of the route.

According to some variations, the TARC 120 selects portions of the transit route 123 based on contextual information. By way of example, the contextual information may include, as determined from target information 113 and service provider information 115, a type of target, vehicle or service used to fulfill the service request 91.

In an example of FIG. 1, the TARC 120 may include context logic 122, which may include rules that factor decisions that affect the selection of portions of the transit route and/or transition points. In particular, context logic 122 can include generalized logic that implements rules that are not specific to location. For example, the transit route 123 may specify that within a building, a person should take stairs to a business that is on the second floor under the assumption that it would take less time to take the stairs. Accordingly, context logic 122 can factor conditions such as time of day, day of week, calendar day, traffic conditions, weather, or other environmental or known variables which may affect an objective of the transit route (e.g., minimizing the transit time, minimizing the distance between the final location of the service provider and the target etc.). In rainy weather, for example, the context logic 122 may cause the TARC 120 to select a vehicle stopping location for the vehicle on the transit route to be one that is indoor or undercover, when the TARC 120 would otherwise select a closer, outdoor stopping point in better weather.

As an addition or variation, the context logic 122 may also include service type logic 124, corresponding to weights or rules for implementing the context logic 122 based on the type of service in use for the transit route or leg. For example, the TARC 120 may determine a different transition point 123 when the first leg of a transit route 123 is completed by a vehicle, based on whether the vehicle is human driven or an autonomous vehicle. For example, the TARC 120 may operate under the assumption that human driven vehicles can be more responsive to dynamic and unknown events on the side of an urban roadway. To further the example, the TARC 120 may guide the human driven vehicle to a vehicle stopping point that corresponds to a visually undefined space on a side of a roadway, while the autonomous vehicle may be guided to a parking space that is well-defined.

Still further, the context logic 122 can also include target logic 126, corresponding to weights or rules for determining the transit route or portion thereof, based on the target information. For example, the target logic 126 can include weights or rules that are specific for a particular sub-region (e.g., specific building, park, mall, etc.). For example, the target logic 126 can specify which entrance to a building or park is preferred based on specific conditions (e.g. time of day or day of week, weather, a type of vehicle used for transit to location near building, etc.). The entrance to the building or park can affect, for example, a vehicle portion of the transit route 123 by influencing the selection of the preceding vehicle stopping location 131 by the TARC 120.

In one example, the TARC 120 utilizes a map service 108 in order to determine at least a portion of the transit route 123. According to some examples, the TARC 120 utilizes vehicle stopping logic 130 to determine a vehicle stopping location 131, corresponding to a transition point 125 for a vehicle on the roadway. For transit routes having one segment that terminates on a roadway, the vehicle stopping logic 130 can identify where the vehicle may stop to satisfy conditions or criteria for proximity to the target. In the case where a user makes a service request 91 (e.g., transit request), the vehicle stopping logic 130 can determine (i) a suitable roadway stopping location, and/or (ii) a municipally defined parking spot. The roadway stopping location may identify locations where a vehicle can, for example, park temporarily, or double park.

In some variations, the vehicle stopping logic 130 implements a database of virtualized vehicle stopping spaces. In one implementation, the target addressing system 100 includes, or has access to a database of virtual vehicular stopping spaces ("VVSS Database 137," or "Virtual DB 137" as referred to in FIG. 1). The VVSS database 137 can logically pre-define vehicle stopping spaces, with each vehicle stopping space corresponding to a space on a roadway where vehicles are permitted to stop, at least for purposes such as rider pick-ups and drop-offs, loading or unloading, or parking for a limited duration of time. The vehicle stopping spaces of the VVSS database 137 can be dimensioned, for example, to accommodate a single vehicle at any one time. The vehicle stopping spaces of the VVSS database 137 can each be associated with parameters that define, for example, a time of day when the vehicle space exists. Other parameters may also define, for example, a type of vehicle which may use the vehicle stopping space (e.g., sedan, or vehicles of certain dimension). Still further, individual vehicle stopping spaces of the VVSS database 137 can be associated with availability parameters, which dictate how likely a vehicle stopping space is going to be available based on contextual information (e.g., day or week, time of day, amount of traffic) and/or sampling of known information (e.g., feedback or input from other vehicles on the roadway).

The TARC 120 can use the vehicle stopping logic 130 to identify one or more vehicle stopping spaces. Once identified, the TARC 120 can communicate the vehicle stopping spaces to providers as part of the transit route 123. In variations, the vehicle stopping logic 130 can include a vehicle interface 132, to enable providers or autonomous vehicles to receive information about the stopping spaces independently of a particular transit. As an addition or alternative, the vehicle interface 132 can provide information that identifies the vehicle spaces in the form of a virtual layer that overlays or accompanies map content, such as provided to a computing device in use in a given vehicle for navigation purposes. In other examples, the vehicle interface 132 can include functionality for receiving location input from individual vehicles (e.g., transit vehicles), and using the VVSS database 137 to identify vehicle spaces that are near the vehicles.

The VVSS database 137 can be generated for a given geographic region using a combination of manual and/or automated input. For example, some vehicles can be outfitted with camera sensors that can scan the edge of the roadways along select city blocks to identify side road segments which can receive vehicles without interference to traffic. The stopping/parking rules of the side road segments can also be determined and correlated to the spaces. For example, the vehicles can scan the street signs for parking or stopping rules (e.g., time when parking or stopping is permitted or forbidden), or the information may be retrieved from publicly available data sources. The determined roadway segments can be logically segmented into vehicle spaces (e.g., on map content) and each vehicle space can be associated with an identifier and an address. In some examples, the address for individual vehicle spaces can be defined by dimensional parameters of length and width, with the dimension accommodating a desired threshold (e.g., dimensioned to accommodate a vehicle type). In some variations, the VVSS database 137 can include data that links identified vehicle spaces to (i) rules for when the vehicle spaces are available (e.g., based on city rules), (ii) rules for how the individual vehicle spaces can be used, such as the duration of time for permissible stopping, or whether the driver can leave the vehicle, and/or (iii) availability data, such as a statistical or analytical determination of whether the space is likely accessible given traffic and demand in a given time period. When determining the stopping location 131 for the vehicle, the vehicle stopping logic 130 can process through a list of virtual spaces, retrieved from VVSS database 137, to identify an order or hierarchy for a driver or vehicle to view the roadway segment for open vehicle spaces. In one implementation, the virtual spaces can be rendered on a map, or alternatively, described semantically to a driver of the vehicle. For example, the virtual spacing may be identified when the vehicle approaches the target by an addressing statement "available space for 3 vehicles to stop ten feet on right, stop at first available space." For autonomous vehicles, the virtual spacing can be identified through data transmission that integrates potentially available vehicle spaces with navigation maps in use with the vehicle.

In similar fashion, the vehicle stopping logic 130 can access a database of parking spaces ("parking space database 139") for a given geographic region. The parking space database 139 can store information about parking spaces, which can be visually identified and subject to parking rules maintained by a municipality or third-party. In some examples, the parking space database 139 can store information that identifies parking lots and structures, parking spaces within the lots/structures, rules for parking lots or spaces, parking rates for lots or spaces, contextual information that may hinder or promote use of specific spaces or lots (e.g., space is narrow and time consuming to use). The parking space database 139 can also identify those parking spaces which are street parking, which for many transit services are more preferable than parking spaces in parking lots. In some variations, the parking space database 139 can also identify a likelihood or probability that a parking space is available, or that a parking lot or area with have open spaces.

For transit routes having multiple segments, the TARC 120 may utilize a sub-region addressing component 140 to determine a transit completion location or transition point 125 within a sub-region, such as a building, park or mall. In one implementation, the TARC 120 uses the target information 113 to determine whether the desired transit completion location is within a sub-region or on a roadway. If within a sub-region, the sub-region addressing component 140 uses the completion location to identify a path within the sub-region to the completion location.

According to some examples, the sub-region addressing component 140 can include ingress selection logic 142 and path selection logic 144. The ingress selection logic 142 can select which of multiple possible ingresses to a given sub-region are best, given the location of the target within the sub-region, a portion of the transit route preceding the sub-region, and/or the transition point (e.g., vehicle stopping location 131) of the preceding transit route. The path selection logic 144 can select a path to the target within the sub-region. In some implementations, the path selection logic 144 can utilize the selected ingress, as determined from the ingress selection logic 142. In other implementations, the selected ingress can be based on a path to the target, as determined from the path selection logic 144.

In selecting the ingress and/or the path, the sub-region addressing component 140 can also utilize sub-region databases (e.g., building database 143, parks database 145) in order to determine the portion of the transit route within the sub-region. For example, the building database 143 can include information that identifies individual buildings, including building geometry, layout, points of ingress and egress to the building, elevators (including floors service by individual elevators), stairwells, stairwell rules (e.g., which stairwells are open from ground-floor), building rules (e.g., rule in which transit user may have to sign in with security guard), business specific rules within individual buildings (e.g., which elevators are accessible without pass-cards). For other types of sub-region such as parks, the sub-region addressing component 140 can access the park database 145, which can include paths, topology, fields, park rules etc. Similar databases may be used for malls (e.g., identify locations of businesses within malls) or other sub-regions. The various sub-region databases 143, 145 can associate landmarks and businesses with various types of information for locating the businesses or landmarks within the sub-regions. Such information can include GPS coordinates, mailing addresses, a section within the sub-region (e.g., floor in building) and/or directional/spatial descriptors that relate a business or landmark to another landmark or point of reference within the sub-region. The sub-region databases 143, 145 can also identify adjacent roadways or other path of travel which may be used by a vehicle or provider to reach the sub-region.

The sub-region addressing component 140 can specify a sequence of actions for addressing a user/provider to a target within a sub-region. For example, for a given business in a specific building, the sub-region addressing component 140 can address a person using a sequence of actions that are to be performed, such as (i) distance and direction to first stop for first action within building (e.g., "forward 50 feet from entrance towards desk, check in . . . "), (ii) distance and/or direction to next stop for next action (e.g., "walk right to 2nd elevator from the far wall, push elevator button and then select floor 4 within elevator"), (iii) distance and/or direction to next stop for next action (e.g., "exit left, third door on right"). The sub-region databases 143, 145 may address to specific locations within a sub-region in this manner, and further utilize landmarks (e.g., for malls, "take escalator to second floor, 5 feet from water fountain, etc.").

The sub-region addressing component 140 can utilize ingress selection logic 142 to select an ingress 141 of a sub-region, from multiple available ingresses, as part of a transit route within the sub-region. The sub-region addressing component 140 can also select an ingress 141 using information provided in a corresponding sub-region database. Such information may also include one or more of a layout for the sub-region, and a determination as to how frequent individual ingresses in the sub-region are used. The ingress selection logic 142 can further determine the selected ingress 141 using, for example, a determined path within the sub-region to the target, the transition point (e.g., vehicle stopping location 131) preceding the arrival of the user/provider to the sub-region, and/or the portion of the route of the vehicle to the vehicle stopping location 131. In making the selection of a particular ingress to the sub-region, the ingress selection logic 142 can optimize the transit route based on one or more parameters, such as (i) minimizing walking distance or time from a vehicle stopping point to the selected ingress of the building, and (ii) maximizing a likelihood that a suitable vehicle stopping point will be available when the vehicle reaches the vicinity of the building.

According to some examples, the TARC 120 can utilize the vehicle stopping logic 130 to select a vehicle stopping location 131 based on parameters of proximity and/or availability to the selected ingress of the sub-region. Thus, the TARC 120 can first select the ingress to the sub-region based on the location of the target, then use the vehicle stopping logic 130 to determine a suitable vehicle stopping location 131. In variations, the vehicle stopping logic 130 can be determined from proximity, time of travel or other metric relative to a main ingress or popular ingress of the sub-region. The vehicle stopping logic 130 can further include logic for selecting the vehicle stopping location 131 based on parameters such as (i) a likelihood that the vehicle stopping point is available, and (ii) a proximity of the vehicle stopping location 131 to either the target or the ingress to the sub-region.

According to various examples, the target for a transit service request can correspond to a person, whose location may vary (e.g., dynamically change). For example, a person may move within a geographic region (e.g., within a city or city block), within a building, or within a business or portion of a building. According to examples, a person can be the target of a transit service even when the person moves from the time the transit service starts, and moreover, without the target/person moving to an agreed meeting point. When the service interface 110 receives a transit request in which a target is a person, the target identifier 95 of the person can be determined by the system 100. For example, the target can correspond to a person who has provided a service identifier (e.g., mobile phone number), along with a permission setting that permits that individual to be located for transit requests (e.g., the individual can be provided with a prompt by the network service giving that individual an opportunity to opt out), with an account store maintained or associated with the system 100.

According to examples in which the target for a transit request is a human, the TARC 120 can determine the transit route 123 with the last leg of the transit route being a dynamically determined address to locate the target/person. For example, the target may be located within a building, and the transit route 123 can specify (i) a first segment in which the vehicle of the service provider parks at a given location, (ii) one or more additional segments in which the service provider is instructed to move through the building or sub-region to get near the target (e.g., within crowded room), and (iii) a final segment in which the service provider is guided to the target. In the final segment, the user/service provider is addressed to the target using communication exchanges between the target's computing device, the service and/or the service provider's computing device.

The TARC 120 can utilize the tracing component 150 to guide the service provider to the target (e.g., location of target device 157). The tracing component 150 can implement a tracing protocol or sequence in order to address the service provider to the location of the target. The tracing component 150 can, for example, initiate a communication sequence in which a target device interface 152 is triggered to ping or request a communication 153 from the target's computing device 157 which can be used to identify the location of the target's computing device (e.g., GPS data from the target's computing device). The tracing component 150 can be selective as to when the communication protocol or sequence is initiated. For example, the timing in which target device interface 152 is triggered can be based on proximity of the service provider to the target device 157.

In one implementation, the tracing component 150 uses target device interface 152 for a coarse determination (e.g., within room or suite of building) of the location of the target. In response to receiving the communication 153 from target device interface 152, the target device 155 (e.g., mobile device of another user) can send back location-relevant information 155 about the location of target, such as GPS data, altimeter data, or location relevant data from other resources of the computing device (e.g., third party applications (e.g., calendar application)) running on the computing device of the target. The type, frequency and source of location relevant information 155 may be limited by permission settings of the target.

In some variations, when the user or service provider is sufficiently close to the target device 157, the mobile computing device of the user/service provider 90, 92 can switch modes, and seek to communicate directly with or detect signals from the target's mobile computing device.

In one implementation, the mobile computing device of the user or service provider can detect short-range wireless signals and/or communications (e.g., such as communicated over Bluetooth or Wi-Fi) from the target's computing device in order to determine directionality and proximity to the target device's location. The target device interface 152 can, for example, trigger the target device 157 to generate location-relevant information 155 in the form of a distinctive trace signal from which a sensor or antenna of the service provider's device can detect proximity and direction. Based on proximity and directionality indication, the mobile computing device of the service provider 92 can provide feedback such as directional arrows or "hot/cold" feedback, until the provider/user is adjacent to the target.

As an addition or variation, visual indicia can be used (e.g., flash phone of target). Still further, a picture of the target may be revealed to the service provider, such as when the user is near the target.

Methodology

Figure 2A:
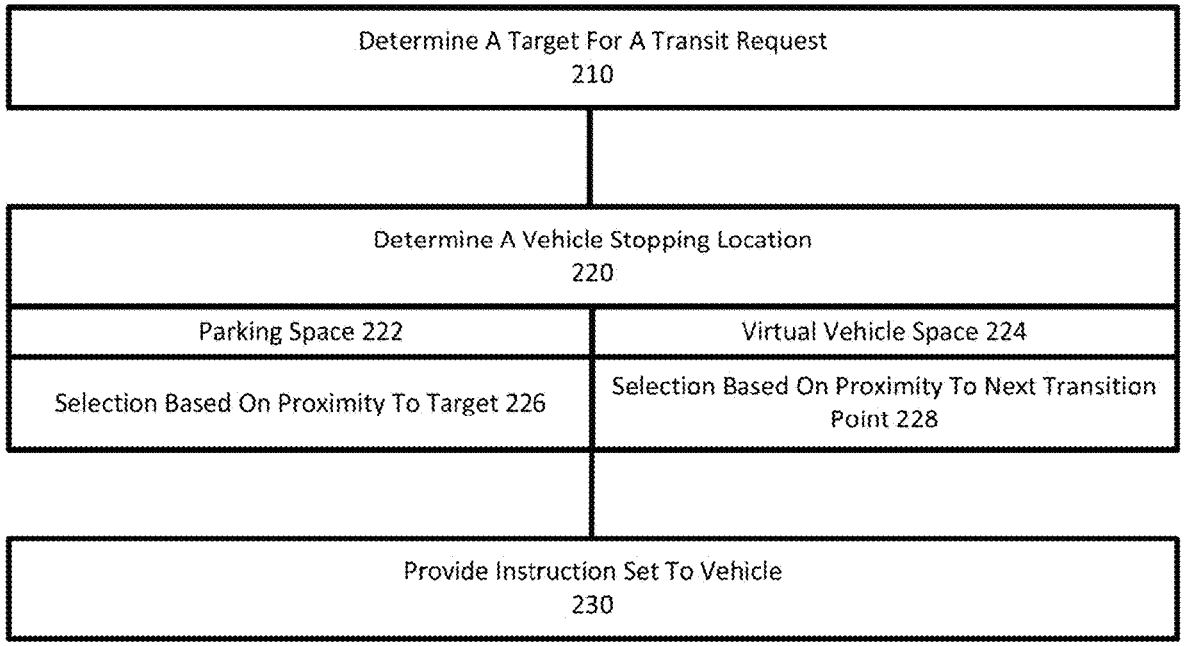
FIG. 2A illustrates an example method for addressing a vehicle or user to a target, according to one or more embodiments.
Figure 2B:
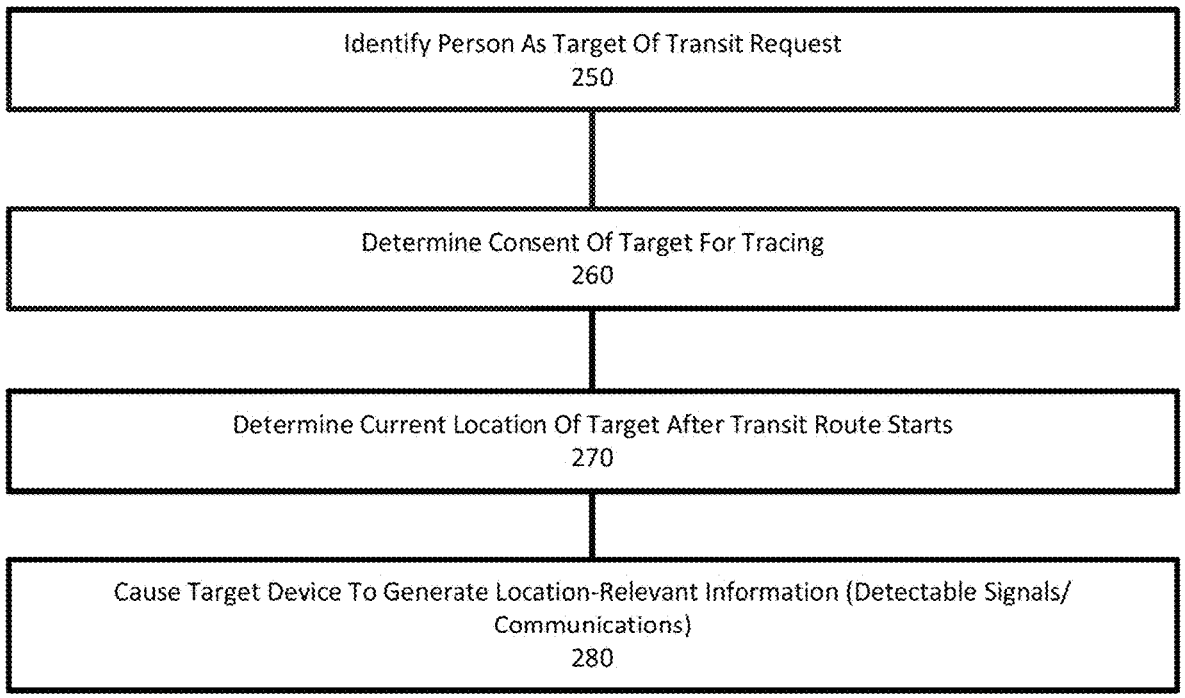
FIG. 2B illustrates a method for addressing a vehicle or user to a target that is a person.

FIG. 2A illustrates an example method for addressing a vehicle or user to a target, according to one or more embodiments. FIG. 2B illustrates a method for addressing a vehicle or user to a target that is a person. In describing examples of FIG. 2A and FIG. 2B, reference may be made to elements of FIG. 1 for purpose of illustrating suitable components for performing a step or sub-step being described.

According to some examples, a target is determined for a transit request (210). In some examples, the target can correspond to a static location, such as a location of a pickup request, or a location within a building. In variations, the target can be a human, such that the location of the target may change.

According to some examples, a vehicle stopping location 131 is determined for a transit route that terminates at a location that is near the target (220). The vehicle stopping location may correspond to a transition point, from which the transit route can be completed or progressed to another segment. The vehicle stopping location 131 may correspond to a parking space (222), or to a roadway segment where vehicle stopping is permitted. In some variations, the target addressing system 100 may maintain a database of virtual vehicular spaces, with each defined vehicle space being associated with an identifier, and the vehicle stopping location 131 may correspond to a virtual vehicle stopping space (224). Still further, in some variations, the target addressing system 100 may track when known vehicles utilize the virtual spaces. The vehicle stopping location 131 can be selected from the virtual vehicle spaces (e.g., from VVSS database 137) and/or parking spaces (e.g., from parking space database 139).

In some examples, the vehicle stopping point can be determined from a selection criterion that includes proximity from the vehicle stopping location 131 to the target (226). The selection criteria can be specific to a virtual stopping space or parking space, or to a region (e.g., south side of parking lot, road segment north of main entrance, etc.).

In implementations in which the target is a location (e.g., pickup location, drop-off location, etc.), the vehicle stopping location 131 can be selected as a parking space or roadway segment that is near (or nearest) to the pickup location. In variations, the vehicle stopping location 131 can be selected as a parking space or roadway segment that is near (or nearest) to a next transition point for the transit route (e.g., selected ingress into building) (228). The basis of selection can include (i) optimizing time or distance for a user or operator to arrive at the target location, either directly or through another route segment (e.g., through a building); and/or (ii) a determination of availability of the spaces. The availability may, for example, be determined from contextual information, such as time of day, day of week or weather (e.g., during rain, cars stop at the side of the road more frequently).

After the vehicle stopping location 131 is determined, an instruction set 127 may be provided to the user or provider, in order to guide the user/provider to the location of the target (230). In some implementations, the instruction set 127 can include a sequence of actions the user/operator should perform in order to meet the optimization objective (e.g., minimize time of transit route or distance walked). In some variations, the instruction set 127 may include directional and spatial terms with reference to landmarks which become visible to the user/service provider as he or she progresses through the transit route 123.

With reference to an example of FIG. 2B, the target addressing system 100 identifies a person who is presumed to have a dynamic (or changing) location while serving as the target of a service request (250). The system 100 can perform a look-up of the identifier provided for the person, in order to determine a device identifier for the person. For example, the service request 91 may specify a target person by legal name, and the service interface 110 or other logic of system 100 may identify the mobile computing device phone number, or service application identifier for the person.

The addressing system 100 may determine that the target has consented to be traced for purpose of a given transit route (or transit routes in general) (260). In some examples, a setting or stored instruction can be determined from an account of the target, signaling the target's consent to be traced for a transit route. According to some examples, the target addressing system 100 may send a request to the target to obtain the target's consent to be traced for purpose of completing the transit route. In variations, the target may provide consent in the form of a setting or preference.

After the transit route is initiated, the system 100 may make one or more requests from the target's computing device for information that identifies a current location of the target (270). The current location of the target may be coarse information, such as provided by GPS coordinates when cross-referenced to a geocoding service. In some examples, a vehicle or person (e.g., user or vehicle) is directed to an estimated location of the target. As the user or vehicle approaches the target or the estimated location of the target, the location of the target may be determined more frequently on the device of the provider. With more frequency determinations, the granularity for the location of the target may become more, until, for example, the target occupies a small area (e.g., 4 foot) within sight of the approaching service provider or user. In variation, a device of the approaching entity (e.g., provider) may selectively communicate with a device of the target as the two devices get closer. As the two devices become closer, the granularity with respect to the relative location of the two devices can increase.

Still further, in some examples, the target addressing system 100 uses the target device 157 to generate location-relevant information 155, such as communications or detectable wireless signals for detection and use by the computing device 92 of the provider (280). The communications may generate detectable visual or audio output from, for example, the mobile computing device of the target, in order to facilitate, for example, the service provider identifying and locating the target.

Figure 3:
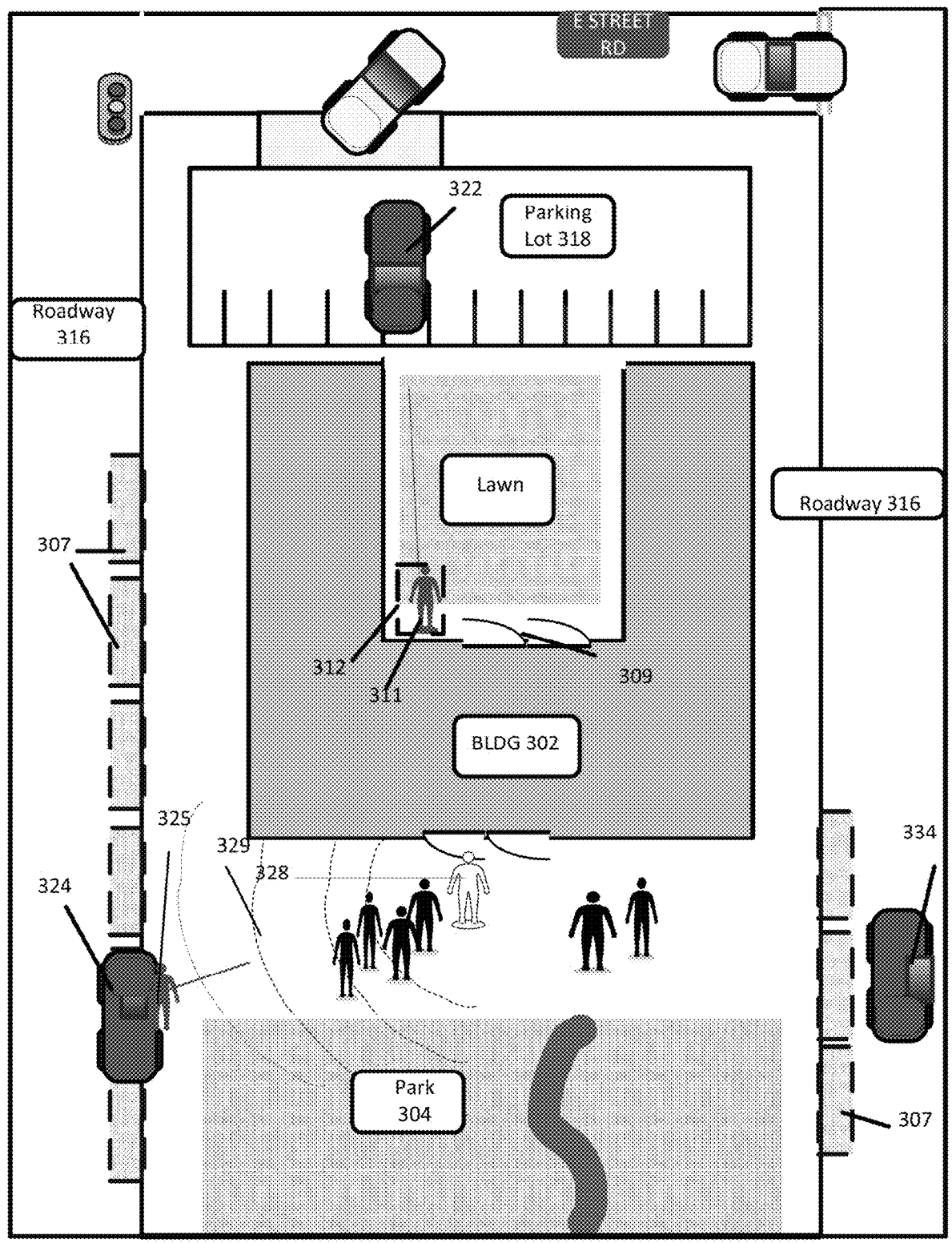
FIG. 3 illustrates various examples for routing service providers to targets within a geographic region.

FIG. 3 illustrates various examples for routing service providers to targets within a geographic region. In FIG. 3, sub-regions include a building 302 and a park 304, surrounded by roadways 316. In one example depicted by FIG. 3, a rider 311 requests a pickup at a pickup location 312, so that the pickup location may correspond to the target. The addressing system 100 may guide a transport service vehicle 322 that is to pickup the rider 311 to a parking lot 318. In one implementation, the addressing system 100 sends instructions to the driver of the transport service vehicle 322, in order to guide the vehicle to a parking space that is near the pickup location 312. For example, the address system 100 may address the vehicle 322 to park in the parking lot 318 on the south end, so that the vehicle 322 is near the pickup location 312. Once the vehicle 322 arrives and/or parks, the rider 311 can be signaled by the system 100 to move to and enter the vehicle 322.

In an example of FIG. 3, the target addressing system 100 can recognize vehicle stopping spaces 307 on the road segments 308 as individual parking spaces, logically defined by an internal map of the vehicle, so as to not be visible on the road segment. In another example, the vehicle 324 may stop in the stopping space 307 in order to be sufficiently near to a location of a target.

Still further, in the example shown, a driver 325 of the vehicle 324 can utilize the virtual stopping space 307 to initiate a new leg of the transit route. The driver 325, for example, may initiate a pedestrian leg in which the addressing system 100 guides the driver to a target person 328. The target device interface 152 may signal a computing device of the target to generate wireless signals 329 that are detectable to the computing device of the driver. The computing device of the driver 325 may be programmed or adapted to detect the wireless signals 329, and further to determine directionality and range from the wireless signals. The driver 325 may start to walk to the target person 328, until the driver is, for example, immediately adjacent to the target person 328.

As another example, a vehicle 334 may correspond to an autonomous vehicle that is transporting a passenger to a drop-off location. The system 100 may configure selection of vehicle stopping location based on the vehicle type (e.g., autonomous) or transit service type (e.g., transport). In the example provided, the target can correspond to the location specified by the rider (e.g., the building 306) and the addressing system 100 elects to ignore virtual stopping spaces based on the vehicle type and/or transit type. For example, the addressing system 100 may weight the selection of the vehicle stopping location to be a parking spot within a parking lot 318, in order to preclude an unpredictable condition which may be present with use of one of the vehicle stopping spaces 307. As an addition or alternative, as the transport is to drop-off the rider, the addressing system 100 may weight selection of the parking lot 318, which is closest to the entrance 309 of the building 306. Thus, in the example provided, the vehicle 334 may be instructed to circle the block in order to reach the parking lot 318.

Figure 4A:
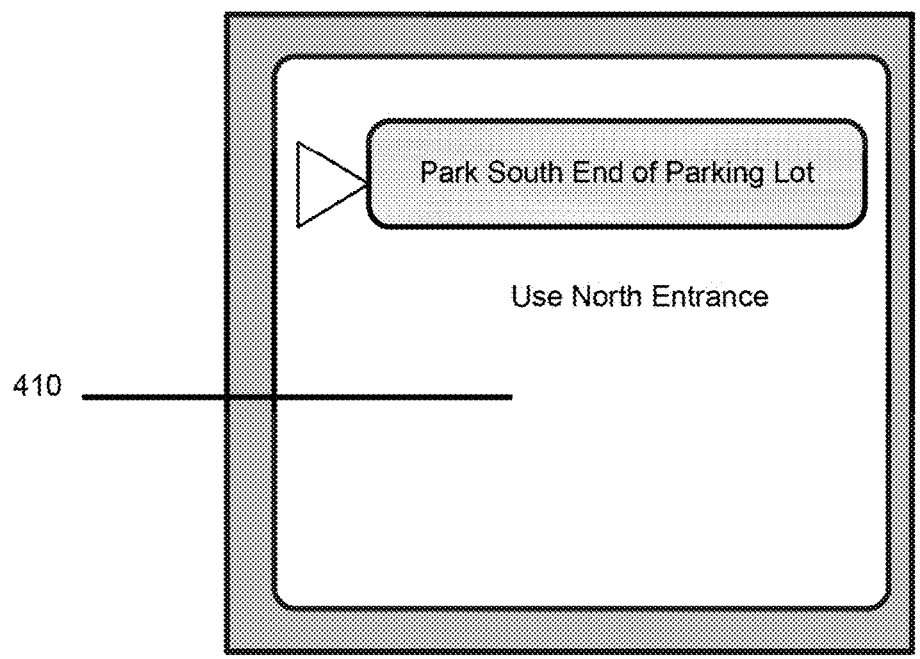
FIG. 4A through FIG. 4C illustrate interfaces for a computing device of a service provider, according to one or more examples.
Figure 4B:
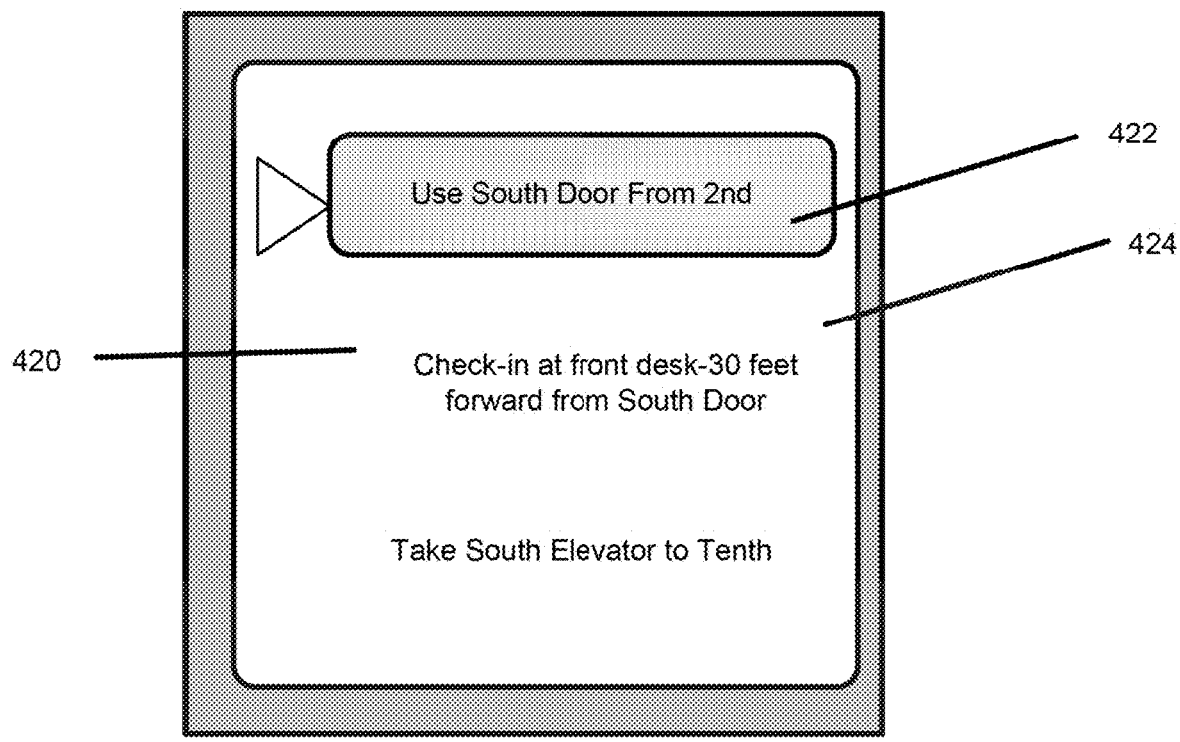
Figure 4C:
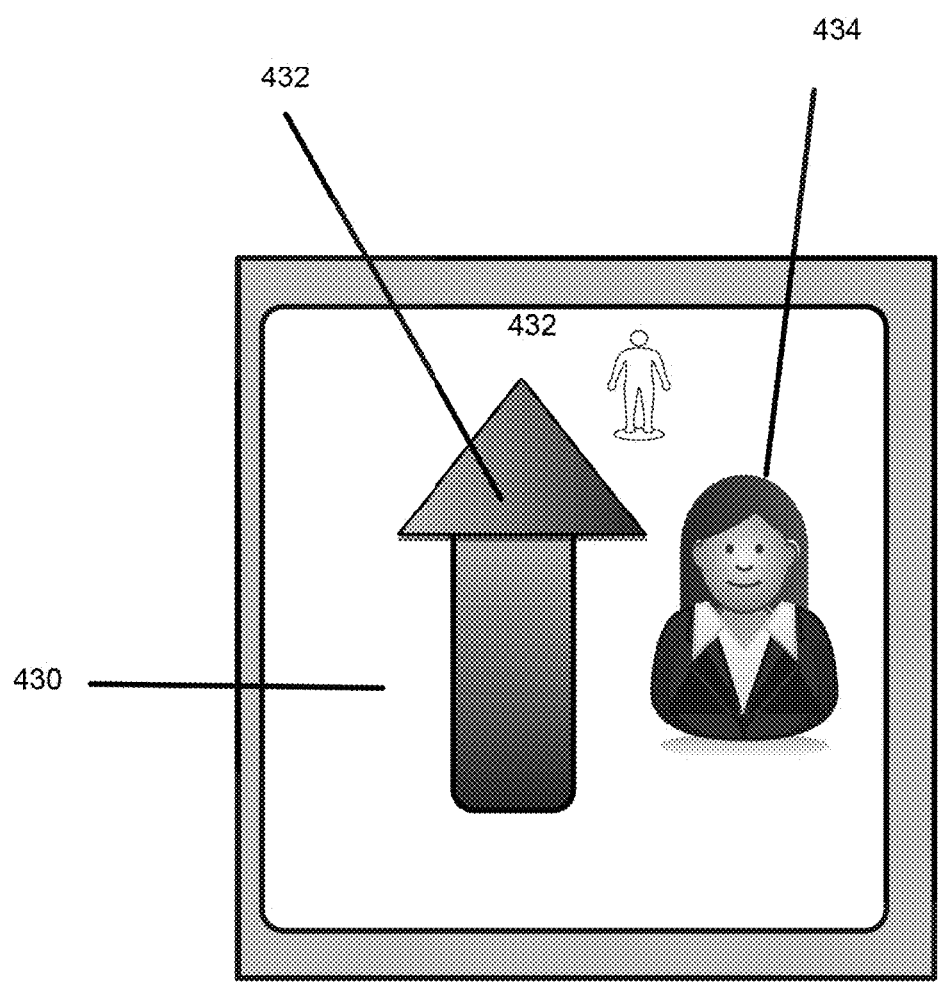

FIG. 4A through FIG. 4C illustrate interfaces for a computing device of a service provider, according to one or more examples. FIG. 4A illustrates an example interface 410 of a computing device used by a driver of a transit service. The interface 410 may display addressing content to identify the vehicle stopping location for the driver, either to reach the target or a transition point for another leg of the transit route.

FIG. 4B illustrates an example interface 420 to render content for a user or service provider that corresponds to an instruction set for guiding the service provider within a target sub-region. The instruction set rendered with the interface 420 may specify a sequence of instructions which the user or service provider may perform in order to reach a target within a sub-region (e.g, building). In the example provided, the instruction set includes a current action 422 and a next action 424.

FIG. 4C illustrates an example interface 430 for addressing a user or service provider to a person. In an example shown, the interface 430 can include a directional guide 432 which can represent information determined from an internal sensor or receiver which determines direction and magnitude from a wireless signal generated from the target computing device. For example, the orientation and length of a graphic icon (e.g., icon) can reflect direction and distance to the target. Additionally, an image of the target 434 can be shown, facilitating the user or service provider in spotting the target person from a crowd.

Hardware Diagrams

Figure 5:
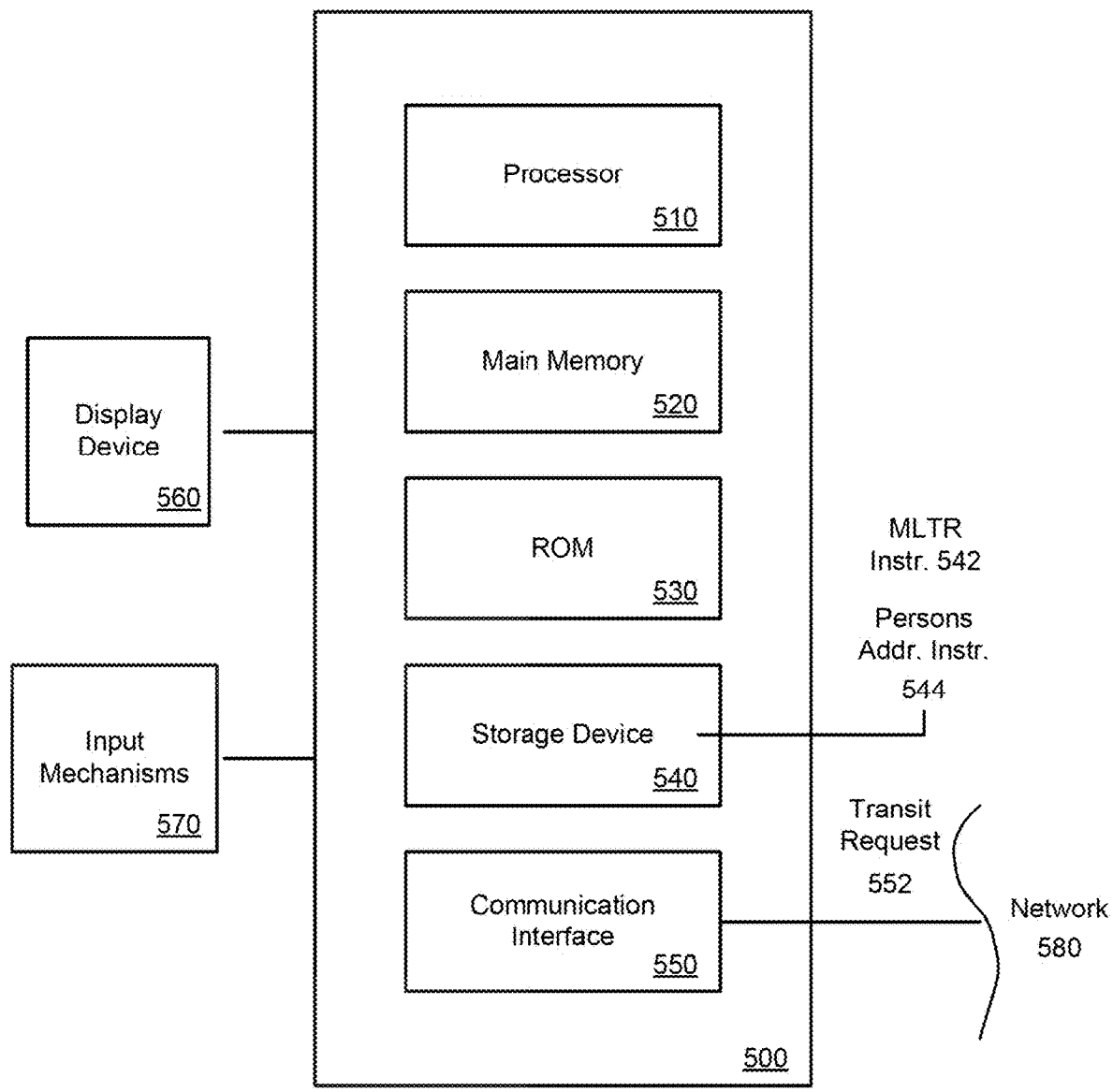
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, the target addressing system 100 may be implemented using a computer system such as described by FIG. 5. The target addressing system 100 may also be implemented using a combination of multiple computer systems as described by FIG. 5.

In one implementation, a computer system 500 includes processing resources 510, a main memory 520, a read only memory (ROM) 530, a storage device 540, and a communication interface 550. The computer system 500 includes at least one processor 510 for processing information and the main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions, including instructions 542 for determining multi-legged transit routes and instructions 544 for determining transit routes to individual persons or other dynamic targets.

For example, the processor 510 can execute the instructions 542 to implement a method such as described with an example of FIG. 2A. Likewise, the processor 510 can implement logic to implement a method such as described with an example of FIG. 2B.

The communication interface 550 can enable the computer system 500 to communicate with one or more networks 580 (e.g., cellular network) through use of the network link (wireless or wireline). Using the network link, the computer system 500 can communicate with one or more other computing devices and/or one or more other servers or data centers. In some variations, the computer system 500 can receive a transit request 552 from a client device of a user via the network link. The transit request 552 can include an identifier of the requester and target, as well as other information such as the transit type.

The computer system 500 can also include a display device 560, such as a cathode ray tube (CRT), an LCD monitor, or a television set, for example, for displaying graphics and information to a user. One or more input mechanisms 570, such as a keyboard that includes alphanumeric keys and other keys, can be coupled to the computer system 500 for communicating information and command selections to the processor 510. Other non-limiting, illustrative examples of input mechanisms 570 include a mouse, a trackball, touch-sensitive screen, or cursor direction keys for communicating direction information and command selections to the processor 510 and for controlling cursor movement on the display 560.

Examples described herein are related to the use of the computer system 500 for implementing the techniques described herein. According to one embodiment, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
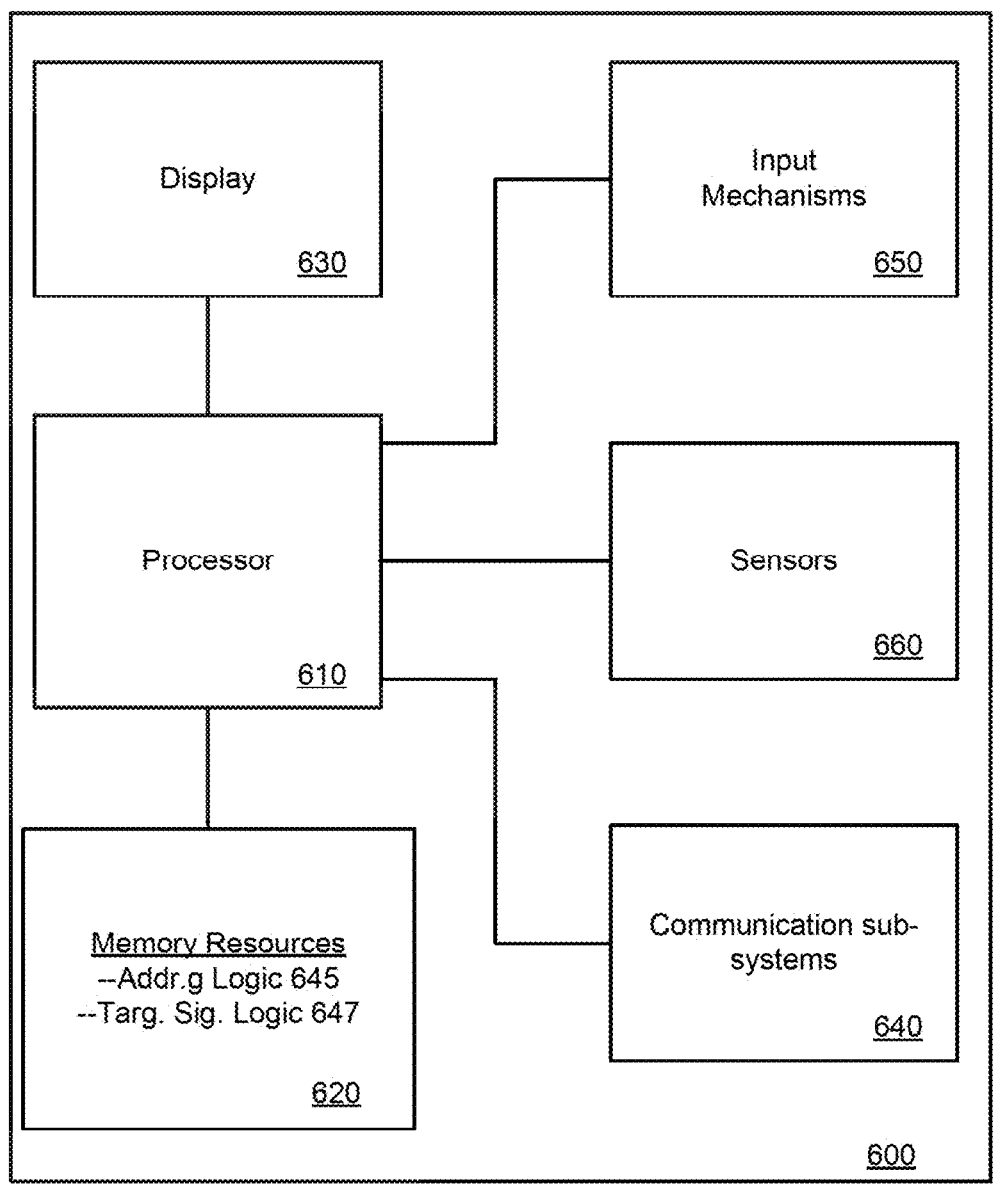
FIG. 6 is a block diagram that illustrates a mobile computing device upon which embodiments described herein may be implemented.

FIG. 6 is a block diagram that illustrates a mobile computing device upon which embodiments described herein may be implemented. In one embodiment, a computing device 600 may correspond to a mobile computing device, such as a cellular device that is capable of telephony, messaging, and data services. The computing device 600 can correspond to a mobile computing device operated by a user or service provider. Examples of such devices include smartphones, handsets or tablet devices for cellular carriers. The computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more sensors (e.g., a GPS component, an accelerometer, one or more cameras, etc.) 660. In one example, at least one of the communication sub-systems 640 sends and receives cellular data over data channels and voice channels.

The processor 610 can provide a variety of content to the display 630 by executing instructions and/or applications that are stored in the memory resources 620. For example, the processor 610 is configured with a target addressing software and/or logic 645 to perform one or more processes, steps, and other functions, including to communicate with a transit service to receive and render an instruction set such as described with any of the examples of FIG. 4A through FIG. 4C. Thus, target addressing logic 645 may include instructions, stored in memory 620, that when executed, cause processor 610 to identify a target person. The target addressing logic 645 may also execute to cause the processor 610 to trigger the target device to generate location-relevant information 155, as described with examples of FIG. 1. As an addition or variation, the processor 610 may also execute target signaling logic 647, which enable the mobile computing device 600 to operate as the target device 157 (see FIG. 1) to communicate directly or indirectly with the provider device 92 and generate location-relevant information 155 (FIG. 1).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer system implementing a network service, the computer system comprising:
   a network communication interface to communicate, over one or more networks, with (i) computing devices of users of the network service, and (ii) computing devices of drivers of the network service;
   one or more processors; and
   a memory storing instructions that, when executed by the one or more processors, cause the computer system to:
      receive, over the one or more networks, a request for a service from a computing device of a given user of the network service;
      based on the request, determine a vehicle stopping location for a driver of a vehicle that is to service the request;
      transmit, over the one or more networks, map data to a computing device of the driver, the map data causing the computing device of the driver to present map content indicating (i) the vehicle stopping location for a vehicular portion of the service, and (ii) a path for the driver from the vehicle stopping location to a target location, the path to be followed by the driver upon parking the vehicle at the vehicle stopping location; and
      transmit, over the one or more networks, a set of delivery instructions to the computing device of the driver, the set of delivery instructions specifying one or more actions for delivering an item to the given user at a location specified by the given user.

2. The computer system of claim 1, wherein the vehicle stopping location comprises a parking space that satisfies a criterion for proximity to the target location.

3. The computer system of claim 1, wherein the location specified by the given user corresponds to a current location of the computing device of the given user.

4. The computer system of claim 1, wherein the executed instructions cause the computer system to determine the vehicle stopping location based, at least in part, on the vehicle stopping location being within a certain proximity to a selected point of ingress into a building in which the target location is located.

5. The computer system of claim 1, wherein the executed instructions cause the computer system to determine the vehicle stopping location by (i) predicting an availability of each of a plurality of parking spaces, and (ii) selecting the vehicle stopping location from the plurality of parking spaces based on predicting the availability of each of the plurality of parking spaces.

6. The computer system of claim 1, wherein the location specified by the given user comprises a dynamic location that changes over a duration of time.

7. The computer system of claim 6, wherein the dynamic location corresponds to a changing location of the computing device of the given user.

8. The computer system of claim 6, wherein the executed instructions cause the computer system to determine the dynamic location through communications, over the one or more networks, with the computing device of the given user.

9. The computer system of claim 1, wherein each instruction in the set of delivery instructions is provided at a pertinent time as the driver follows the path in order to guide the driver to the location specified by the given user.

10. The computer system of claim 9, wherein the one or more actions comprise at least one of an elevator selection or a door selection.

11. The computer system of claim 9, wherein the set of delivery instructions further references one or more landmarks along the path to guide the driver to the location specified by the given user.

12. A non-transitory computer readable medium storing instructions that, when executed by one or more processors of a computing system, cause the computing system to:
   communicate, over one or more networks, with (i) computing devices of users of a network service, and (ii) computing devices of drivers of the network service;
   receive, over the one or more networks, a request for a service from a computing device of a given user of the network service;
   based on the request, determine a vehicle stopping location for a driver of a vehicle that is to service the request;
   transmit, over the one or more networks, map data to a computing device of the driver, the map data causing the computing device of the driver to present map content indicating (i) the vehicle stopping location for a vehicular portion of the service, and (ii) a path for the driver from the vehicle stopping location to a target location, the path to be followed by the driver upon parking the vehicle at the vehicle stopping location; and
   transmit, over the one or more networks, a set of delivery instructions to the computing device of the driver, the set of delivery instructions specifying one or more actions for delivering an item to the given user at a location specified by the given user.

13. The non-transitory computer readable medium of claim 12, wherein the vehicle stopping location comprises a parking space that satisfies a criterion for proximity to the target location.

14. The non-transitory computer readable medium of claim 12, wherein the location specified by the given user corresponds to a current location of the computing device of the given user.

15. The non-transitory computer readable medium of claim 12, wherein the executed instructions cause the computer system to determine the vehicle stopping location based, at least in part, on the vehicle stopping location being within a certain proximity to a selected point of ingress into a building in which the target location is located.

16. The non-transitory computer readable medium of claim 12, wherein the executed instructions cause the computer system to determine the vehicle stopping location by (i) predicting an availability of each of a plurality of parking spaces, and (ii) selecting the vehicle stopping location from the plurality of parking spaces based on predicting the availability of each of the plurality of parking spaces.

17. The non-transitory computer readable medium of claim 12, wherein the location specified by the given user comprises a dynamic location that changes over a duration of time.

18. The non-transitory computer readable medium of claim 17, wherein the dynamic location corresponds to a changing location of the computing device of the given user.

19. A computer-implemented method of coordinating delivery, the method being performed by one or more processors and comprising:
communicating, over one or more networks, with (i) computing devices of users of a network service, and (ii) computing devices of drivers of the network service;
receiving, over the one or more networks, a request for a service from a computing device of a given user of the network service;
based on the request, determining a vehicle stopping location for a driver of a vehicle that is to service the request;
transmitting, over the one or more networks, map data to a computing device of the driver, the map data causing the computing device of the driver to present map content indicating (i) the vehicle stopping location for a vehicular portion of the service, and (ii) a path for the driver from the vehicle stopping location to a target location, the path to be followed by the driver upon parking the vehicle at the vehicle stopping location; and
transmitting, over the one or more networks, a set of delivery instructions to the computing device of the driver, the set of delivery instructions specifying one or more actions for delivering an item to the given user at a location specified by the given user.

20. The method of claim 19, wherein the vehicle stopping location comprises a parking space that satisfies a criterion for proximity to the target location.

* * * * *